Figure 1:
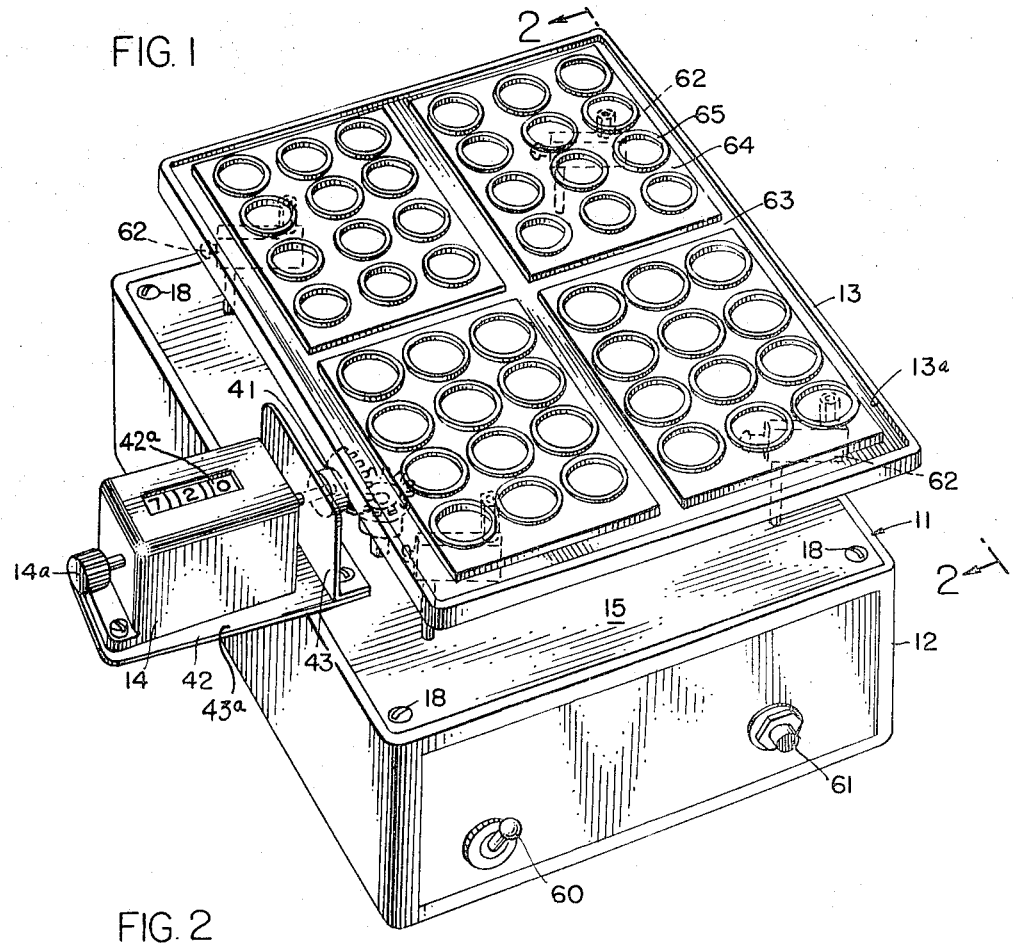

March 21, 1967 R. R. MOORE 3,310,292
SEROLOGICAL TESTING DEVICE
Original Filed March 13, 1964 2 Sheets-Sheet 1

INVENTOR:
ROBERT R. MOORE
BY
Dawson, Tilton, Fallon, Lungmus & Alexander
ATT'YS

March 21, 1967 R. R. MOORE 3,310,292
SEROLOGICAL TESTING DEVICE
Original Filed March 13, 1964 2 Sheets-Sheet 2

INVENTOR:
ROBERT R. MOORE
BY
Dawson, Tilton, Fallon, Lungmus & Alexander
ATT'YS

3,310,292
SEROLOGICAL TESTING DEVICE

Robert R. Moore, Glenview, Ill., assignor to American Hospital Supply Corporation, Evanston, Ill., a corporation of Illinois
Continuation of application Ser. No. 351,658, Mar. 13, 1964. This application June 20, 1966, Ser. No. 560,963
9 Claims. (Cl. 259—72)

This application is a continuation of my co-pending application, Ser. No. 351,658, filed Mar. 13, 1964, now abandoned.

This invention relates to a testing device and, more specifically, to a device which is particularly suitable for running serologic flocculation tests and which is capable of precisely controlling both the duration and degree of agitation of test samples.

Serologic techniques are commonly used in running venereal disease screening tests and other well-known tests such as Mazzini and Plasmacrit tests. In venereal disease flocculation tests, for example, a precise quantity of a carefully prepared antigen emulsion of known strength is placed on a slide along with a specific amount of a patient's serum. After the antigen and serum have been mixed, usually by hand agitation, for a predetermined period, the slide is examined microscopically for the presence of agglutination or flocculation of the test materials. If flocculation is present to an appreciable extent, the test is regarded as positive, otherwise it is considered negative.

The test is essentially a screening procedure and the extent of flocculation depends not only on the reactivity of the serum and antigen but also on the degree and duration of the agitation. With excessive agitation, either in extent of duration, enough flocculation may occur to give a false indication of a positive reaction. Conversely, if the agitation is insufficient, a positive reaction might conceivably remain undetected. Under these circumstances, hand agitation is clearly inadequate for accurate testing. While mechanical agitators are available, these devices are generally regulated by timers which operate solely on the basis of elapsed time without regard to the number of oscillations of the agitator, and such timers are otherwise frequently subject to considerable variations in performance. Thus, even when mechanical agitators are used, the degree and duration of agitation are still variable factors, and the extent of such variation is sufficiently great to give rise to the possibility of misleading test results and the serious consequences which might be occasioned thereby.

Accordingly, it is a principal object of the present invention to provide a serological testing device which overcomes the aforementioned defects and disadvantages of conventional mechanical agitators used for such purposes. Specifically, it is an object to provide an improved serological testing device capable of precisely controlling both the time and degree of agitation of a serum emulsion and reagent mixture.

Another object is to provide an agitator for use in conducting serological flocculation tests, the agitator being constructed to be substantially foolproof in operation and, specifically, to be free of defects or interruptions in its operation which might remain undetected and which might otherwise affect the reproducibility of test results. A still further object is to provide a device for automatically subjecting test materials to a predetermined degree of agitation, measured in terms of number of oscillations, over a given period of time and which is further equipped with means for quickly and easily ascertaining whether such predetermined standards have been met.

Figure 2:
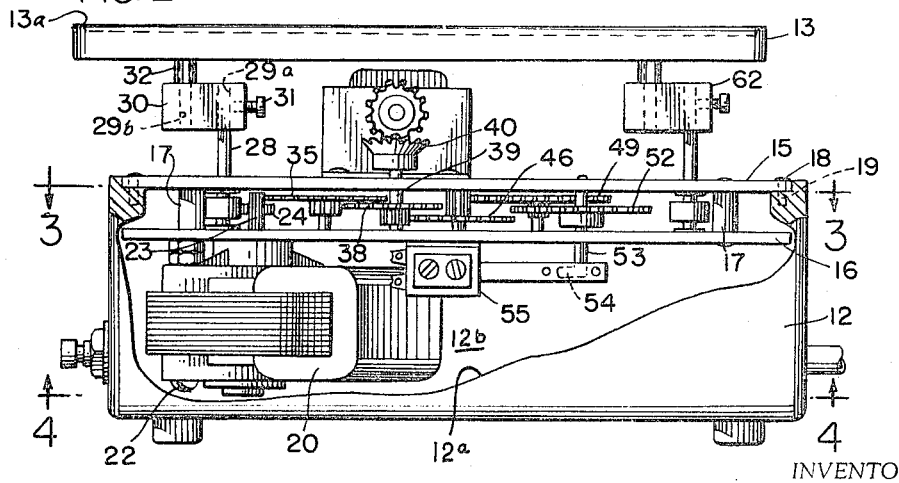
Figure 3:
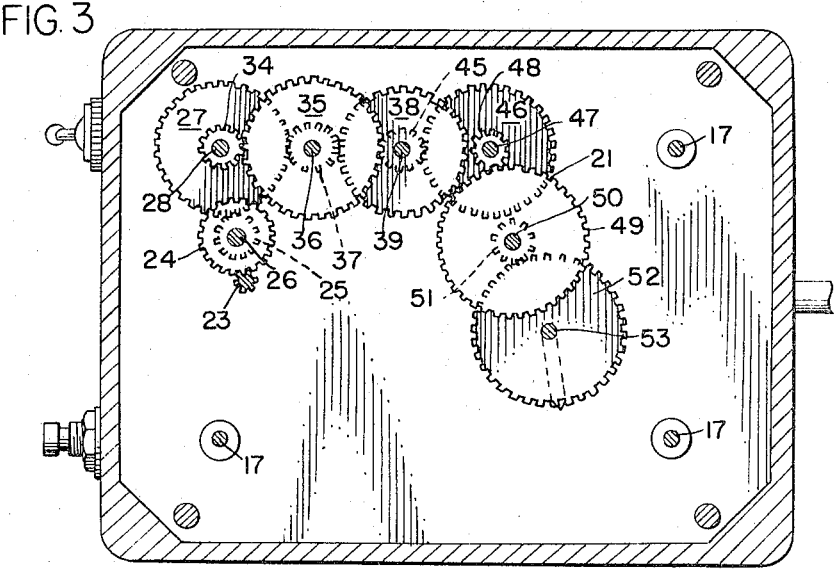
Figure 4:
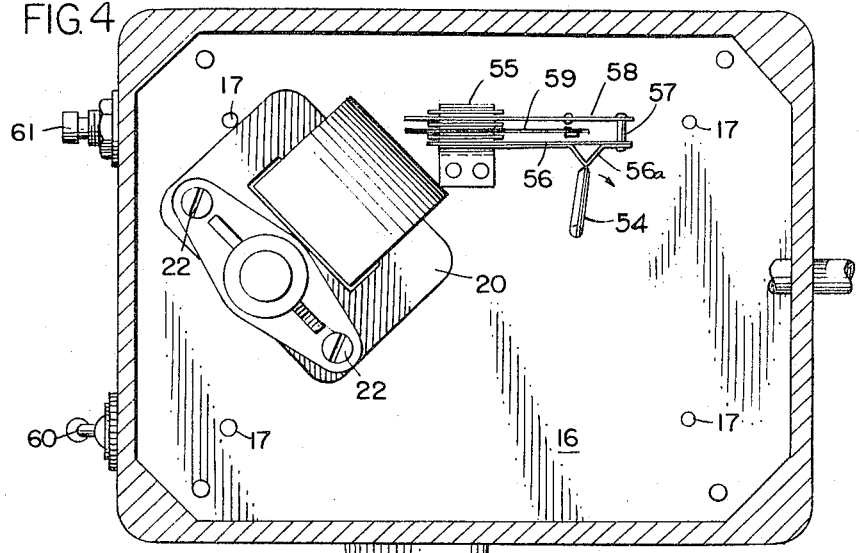
Figure 5:
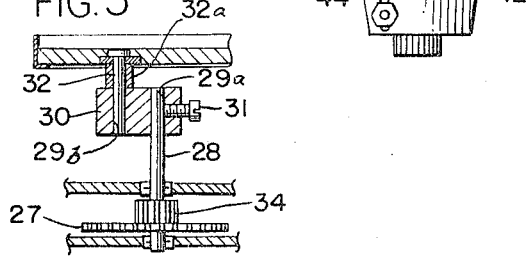

Other objects will appear from the specification and drawings in which:

FIGURE 1 is a perspective view illustrating a testing device embodying the principles of the present invention;
FIGURE 2 is a side elevational view of the device with certain portions of the casing thereof broken away to illustrate internal details of construction;
FIGURE 3 is a horizontal sectional view of the device taken along line 3—3 of FIGURE 2;
FIGURE 4 is another horizontal sectional view taken along line 4—4 of FIGURE 2;
FIGURE 5 is an enlarged fragmentary vertical sectional view illustrating a portion of the agitator drive mechanism.

In the embodiment of the invention illustrated in the drawings, the numeral 11 generally designates a serological testing device having a base or frame 12 upon which is mounted a platform 13 and a rotation counter 14.

Base 12 comprises a casing 12a defining a chamber 12b therein. The open top of the casing is closed by an upper mounting plate 15, and a lower mounting plate 16 is suspended from the upper plate by a plurality of spacing studs 17. The upper mounting plate is affixed to the casing or shell 12a by means of screws 18 threadedly received in sockets or wells 19.

An electric motor 20 is disposed within the lower portion of chamber 12b and drives a gear train 21 positioned between the spaced horizontal upper and lower mounting plates 15 and 16. As shown in FIGURES 2 and 4, a pair of mounting screws 22 suspend the motor from the lower mounting plate 16. It will be noted that the upper mounting plate serves the dual functions of providing an upper mounting for the gear train and also of providing a substantially imperforate protective cover for the casing and its contents.

The gear train 21 essentially comprises a series of gears in constant intermeshing engagement which, for the most part, are disposed between the upper and lower mounting plates and have their shafts journaled in opposing sockets provided by those plates. The gears themselves are of conventional construction; however, it is to be noted that the train is uninterrupted or continuous; that is, none of the elements to be driven by the mechanism are interposed in the train. Rather, the driven components, as will be described hereinafter, are tapped off of the train at various points or stages therealong. These stages may for convenience be considered as primary, intermediate, and final stages.

The primary stage includes a pinion gear 23 provided as an integral part of the drive shaft of motor 20, the shaft extending upwardly from the motor through an opening in the lower mounting plate 16. Gear 23 is in inter-meshing relationship with fibrous silencing gear 24 which, together with pinion 25, is mounted on shaft 26. Pinion 25 of the first stage engages sprocket gear 27 carried by shaft 28 (FIGURE 3).

As shown in FIGURES 2 and 5, shaft 28 extends upwardly through a hole in upper mounting plate 15 and is received in a socket 29a provided by eccentric connecting element 30. Screw 31 anchors the shaft 28 within its sockets. A platform driving stud 32 is rotatably received within bore 29b of the eccentric and is provided with a collar 32a which supports platform 13. Since the axis of stud 32 is spaced from the axis of shaft 28, and since the upper end of the stud is rotatably received in an opening provided by the platform, rotation of the shaft 28 will result in oscillatory movement of the platform in a horizontal plane. In the preferred embodiment of the invention, the axes of shaft 28 and stud 32 are 3/8 of an inch apart; therefore, the platform 13 will circumscribe a 3/4 inch circle about the axis of stud 32 for every rotation of shaft 28.

Motor 20 and the primary stage of the gear train cooperate to produce a substantially constant rotational speed of 180 revolutions per minute of shaft 28. Thus, platform 13 will oscillate at 180 oscillations per minute. It has been found that a non-synchronous relatively high speed motor may be effectively used in the combination of the present invention if its torque output is substantially in excess of the use requirements because of the substantial reductions in speed between the motor pinion 23 and the driving member 28. For example, with a motor pinion operating at approximately 3200 r.p.m., slight variations in the motor speed will not significantly affect the rotational speed or rate of the member 28.

The intermediate stages of the gear train include pinion 34 carried by shaft 28 and meshed with sprocket gear 35. Gear 35 is in turn supported by shaft 36 which also carries pinion 37 intermeshing with sprocket gear 38. The sprocket gear 38 is carried by shaft 39 which projects upwardly through the upper mounting plate 15 and which has at its upper end a bowl-shaped miter gear 40. The miter gear is in right-angled intermeshing relation with miter gear 41 provided on the shaft of digital rotation counter 14.

Counter 14 is securely attached to support 42 which includes a vertical plate member 43 and a substantially horizontal plate member 43a. As shown in FIGURE 1, plate 43 is provided with an opening rotatably receiving the shaft of digital counter 14. A manual reset knob 14a is provided for setting the counter at a zero reading at the beginning of each run. Except for its use in the combination of the present invention, the digital counter 14 is entirely conventional and a detailed description of its structure and operation is believed unnecessary herein. The counter must have at least three digit wheels each bearing ten numerals (0 through 9). In the structure shown in the drawings, digit wheel 42a rotates once for each rotation of the drive shaft of the counter and, therefore, 10 numerals pass in front of the window for each rotation of the shaft. The ratio between the shaft of the counter and shaft 39 is 1:1, and the size and number of teeth of gears 34, 35, 37 and 38 are such that shaft 39 rotates once for each 10 rotations of shaft 28. Thus, each oscillation of platform 13 is registered by counter 14, with a total of 720 oscillations so registered in an operating interval of four minutes.

In the illustrated embodiment, the rotational counter is of the type which is in constant intermeshing engagement with its driving means. This driving relationship is particularly important to insure uninterrupted operation of the counter and a high degree of accuracy of recording despite the vibration to which the components are subjected in operation.

The final stage of the gear train 21 includes a pinion 45 which is mounted to the shaft 39 and which drives a sprocket gear 46. The sprocket gear is supported by shaft 47 and drives pinion 48 and sprocket gear 49, the latter being carried by shaft 50. Sprocket 49 drives pinion 51 which is meshed with sprocket gear 52.

Referring to FIGURES 2, 3 and 4, it will be noted that sprocket gear 52 is supported by a shaft 53 having an end portion 54 extending downwardly through the lower mounting plate 16. The lower end portion of the shaft is bent radially outwardly to actuate a shut-off switch 55 as it sweeps into engagement with angular portion 56a of flexible contact arm 56. When the arm is flexed or cammed by the radial end portion 54 of the shaft, it bears against insulating stud 57 to urge flexible contact arm 58 away from stationary contact arm 59, thereby breaking the circuit and interrupting the flow of current to motor 20. The reduction of the gear train is such that shaft 53 makes a single complete revolution for every 720 oscillations of platform 13, or, in other words, operates at ¼ r.p.m.

The device is also provided with a conventional on-off switch 60 and with a starter switch 61. When the automatic shut-off switch 55 has been actuated by the radial arm into the "off" position illustrated in FIGURE 4, shifting of toggle switch 60 into an "on" position will not of itself actuate motor 20. Starter switch 61 is thereby provided to bypass shut-off switch 55 and directly energize motor 20 to drive the gear train until radial arm 54 swings out of contact with flexible arm 56.

In addition to the power-driven eccentric 30, platform 13 is also supported by three similar eccentrics 62 which, although they do not receive power from the electric motor, provide a guiding support for directing the oscillatory movement of the platform.

Referring to FIGURE 1, it will be seen that platform 13 is provided with a protective rim 13a and a non-slip top surface 63 which may, if desired, comprise a layer of sponge rubber or any other suitable material having similar slip-resisting properties. Four glass slides 64 are shown resting upon surface 63, each of the slides having a plurality of ceramic rings 65 which project upwardly from the surface of the glass to define circular cavities for supporting and retaining the liquid testing materials.

In normal operation, the device is first allowed to operate until member 58 is deflected and the motor is automatically de-energized, with toggle switch 60 remaining in its "on" position. A small amount of serum, usually $5/100$ milliliter, is then placed in each of the open cavities of slides 64. One drop ($1/60$ milliliter) of a prepared antigen emulsion of known strength is added to each serum sample. With the digital counter set to zero, the operator then depresses the button of starter switch 61, to energize the motor and cause platform 13 to oscillate in a horizontal plane, circumscribing ¾ inch circles at a rate of 180 revolutions per minute. While the revolution counter is in constant engagement with the second stage of the gear train, and although it records each of the oscillations of the platform, it does not directly control either the commencement or the interruption of the operation of the motor. Such operation is interrupted by engagement between switch 55 and the radial portion of shaft 53 of the final stage. Since sprocket 52 makes one revolution for each 720 revolutions of shaft 28, the platform stops rotating, and the samples may be removed therefrom, when a total of 720 oscillations have been executed. The number of revolutions or oscillations may be verified by visual inspection of digital counter 14 and if a number other than 720 is registered, the technician will immediately know that some malfunctioning of the cut-off switch has occurred and that either the tests must be rerun or that suitable adjustments must be made. While improper functioning of the switch 55 is not to be expected, it is entirely possible that even with the most carefully built equipment the effects of wear and prolonged vibration may produce physical changes which might alter the operation of the apparatus and which might remain undetected if it were not for the arrangement of parts, including the counter, as disclosed herein.

It is believed, therefore, that the serological testing device of the present invention constitutes a simple and highly effective and accurate means for timed slide rotation. An operator would be assured as to the reliability and reproducibility of the test results by simply referring to the digital counter to make certain that each batch of samples has been agitated exactly in accordance with the required standardized testing procedure.

While in the foregoing specification, the invention has been disclosed in considerable detail for purposes of illustration, it will be understood by those skilled in the art that many of these details may be varied without departing from the spirit and scope of the invention.

I claim:

1. In a serological testing device having a base, a motor, and a platform adapted to be oscillated in a horizontal plane by said motor, the combination of gear means driven by said motor comprising a train of constantly intermeshing gears carried by a plurality of supporting shafts, one of said shafts being operatively associated with said platform for oscillating the same, a cut-off switch mounted on said base for interrupting operation of said motor, means provided by another of said shafts for actuating said cut-off switch when said platform has executed a predetermined number of oscillations, and a rotation counter supported by said base and operatively associated with one of said gears for registering the exact number of oscillations of said platform.

2. The structure of claim 1 in which said one of said gears is supported by a shaft other than the shafts associated with said platform and with said cut-off switch.

3. In a serological testing device having a base, a substantially constant-speed electric motor, and a platform mounted upon said base and adapted to be oscillated in a horizontal plane by said motor, the combination of a gear train driven by said motor consisting essentially of a plurality of gears arranged in constant intermeshing engagement and being carried by a plurality of shafts supported by said base, one of said shafts being operatively associated with said platform for oscillating the same, a cut-off switch secured to said base for de-energizing said motor, means provided by said gear means for actuating said cut-off switch when said platform has executed a predetermined number of oscillations, and a rotation counter supported by said base and in constant-drive engagement with one of said gears for registering the exact number of oscillations of said platform.

4. In a serological testing device having a frame, a substantially constant-speed electric motor, and a platform mounted upon said frame and adapted to be oscillated in a horizontal plane by said motor, the combination of a gear train driven by said motor consisting of a plurality of primary, intermediate, and final stage gears arranged in constant intermeshing engagement and being carried by a plurality of shafts supported by said frame, one of said shafts of said primary stage being operatively associated with said platform for oscillating the same, a rotation counter supported by said frame and operatively associated with a gear of said intermediate stage for indicating the exact number of oscillations of said platform, a cut-off switch for de-energizing said motor, and means provided by a shaft of said final stage for actuating said cut-off switch when said platform has executed a precisely predetermined number of oscillations.

5. A serological testing device for precisely controlling both the duration and degree of agitation of a serum and reagent mixture, comprising a frame, an electric motor mounted upon said frame, a platform for supporting a slide capable of retaining a serum-reagent sample, a plurality of eccentrics connecting said platform to said frame and supporting said platform for oscillatory movement along a horizontal plane, a gear train comprising a plurality of primary, intermediate, and final stage gears in constant intermeshing engagement and being carried by a plurality of shafts supported by said frame, one of said shafts being operatively connected to one of said eccentrics for oscillating said platform as said gear train is driven by said motor, a rotation counter supported by said frame in constant engagement with an intermediate stage gear for recording the exact number of oscillations of said platform, a cut-off switch for de-energizing said motor, and means associated with one of the gears of said final stage for actuating said cut-off switch when said platform has executed a predetermined number of oscillations.

6. A serological testing device having a frame, a substantially constant-speed electric motor mounted upon said frame, a slide-supporting platform mounted upon said frame for oscillatory movement in a horizontal plane, a rotation counter secured to said frame, and a gear train driven by said motor and comprising a plurality of gears arranged in constant intermeshing engagement and carried by a plurality of shafts supported by said frame, one of said shafts being operatively associated with said platform for oscillating the same when said train is driven by said motor, said rotation counter being in constant-drive engagement with a gear of said train for indicating the precise number of oscillations of said platform.

7. A serological testing device having a frame, a relatively high speed motor mounted upon said frame, a slide-supporting platform mounted on the frame for oscillatory movement in a horizontal plane, a gear train driven by said motor and consisting of a plurality of primary, intermediate, and final stage gears arranged in constant intermeshing engagement and carried by a plurality of shafts supported by said frame, one of said shafts of said primary stage being operatively associated with said platform for oscillating the same, the gears of said primary stage providing a substantial speed reduction whereby said one shaft rotates at greatly reduced rates with respect to the relative high speed of said motor, and a rotation counter supported by said frame and operatively associated with a gear of said intermediate stage for indicating the exact number of oscillations of said platform.

8. The structure of claim 7 in which said device is also provided with a cut-off switch for deenergizing said motor, and means associated with one of the gears of said final stage for actuating said cut-off switch precisely when said platform has executed a predetermined number of oscillations.

9. A serological testing device having a frame, a substantially constant-speed electric motor mounted upon said frame, a slide-supporting platform mounted upon said frame for oscillatory movement in a horizontal plane, a rotation counter secured to said frame, and a drive train driven by said motor and comprising a plurality of rotary drive elements arranged in constant operative engagement and carried by a plurality of shafts supported by said frame, one of said shafts and drive elements being operatively associated with said platform for oscillating the same when said train is driven by said motor, said rotation counter being in positive driven relation with said drive train for indicating the precise number of oscillations of said platform.

References Cited by the Examiner

UNITED STATES PATENTS 3,045,987   7/1962   Cake _____ 259—72
3,061,280   10/1962  Kraft et al. _____ 259—72

IRVING BUNEVICH, *Primary Examiner.*

CHARLES A. WILLMUTH, *Examiner.*

J. M. BELL, *Assistant Examiner.*